E. M. ARNOLD.
FENDER BRACE.
APPLICATION FILED OCT. 7, 1921.

1,408,966.

Patented Mar. 7, 1922.
2 SHEETS—SHEET 1.

INVENTOR
Edwin M. Arnold.
BY
ATTORNEY

E. M. ARNOLD.
FENDER BRACE.
APPLICATION FILED OCT. 7, 1921.
1,408,966.
Patented Mar. 7, 1922.
2 SHEETS—SHEET 2.
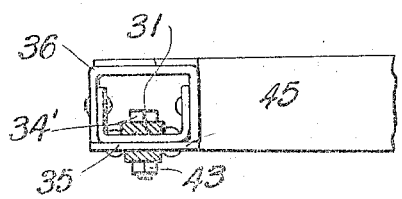
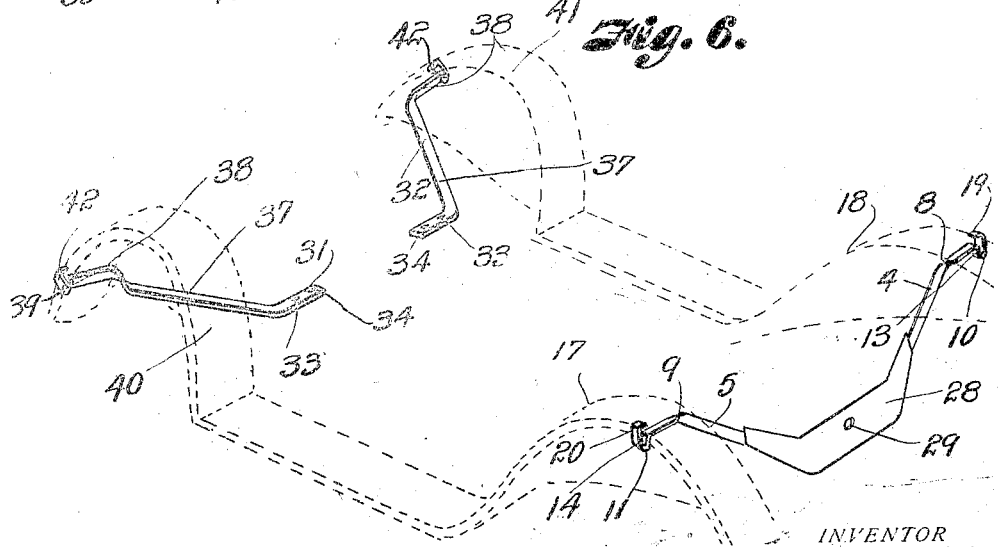
INVENTOR
Edwin M. Arnold
BY
ATTORNEY

UNITED STATES PATENT OFFICE.

EDWIN M. ARNOLD, OF TULSA, OKLAHOMA.

FENDER BRACE.

1,408,966.

Specification of Letters Patent.   Patented Mar. 7, 1922.

Application filed October 7, 1921. Serial No. 506,069.

*To all whom it may concern:*

Be it known that I, EDWIN M. ARNOLD, a citizen of the United States, residing at Tulsa, in the county of Tulsa and State of Oklahoma, have invented certain new and useful Improvements in Fender Braces; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to fender braces for motor vehicles, the construction being such that the fender brace may also support a splash guard at the forward portion of the motor vehicle beneath the hood or radiator.

The invention is illustrated as applied to the standard type of motor vehicle now manufactured by the Ford Motor Company of Detroit, Michigan.

The invention is so constructed that it may be attached to existing types of motor vehicles without the necessity of drilling holes or requiring special tools and the primary object is to provide means for bracing the fenders and supporting a splash guard at the front thereof, the construction being such that the invention can be readily applied.

In the drawings,

Fig. 4 is a rear view of a motor vehicle to which the rear fender braces are attached.

Fig. 5 is a side view of a corner of the chassis frame, and

Fig. 6 is a diagrammatic view of the fenders and running boards showing the braces and the splash guard secured thereto.

Figure 1:
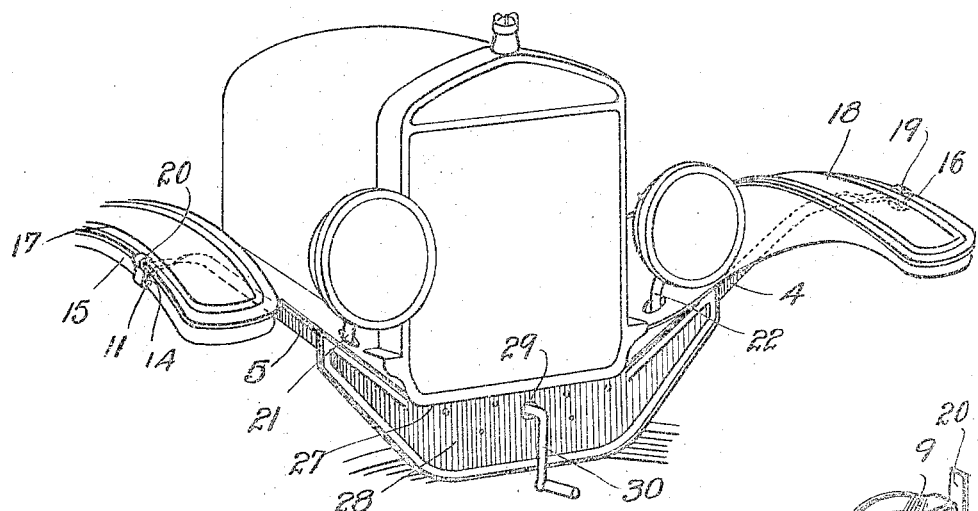
Fig. 1 is a perspective view of the hood, radiator and front fenders of a conventional form of motor vehicle to which my invention is applied.

The front braces consist of a sectional, transverse, tying device and brace which comprises a central bar 1 having offset outstanding terminal arms 2 and 3, to which the end brace members 4 and 5 may be secured by the bolts 6—6 and 7—7 respectively. The arms 2 and 3 are inclined upwardly and support the upwardly inclined brace members 4 and 5, which have their terminals twisted at right angles, as indicated at 8 and 9, the ends of the terminal portions being bent downwardly and upwardly, as at 10 and 11, to provide slots or notches 13 and 14 to receive the flanged portions 15 and 16 of the front fenders 17 and 18.

When the device leaves the factory the fingers 19 and 20 are extended above the portions 8 and 9 but when applying the braces, the fingers 19 and 20 are bent over against the fenders, as shown in Fig. 1, so that the fenders will be securely braced and held in proper position.

Figure 2:
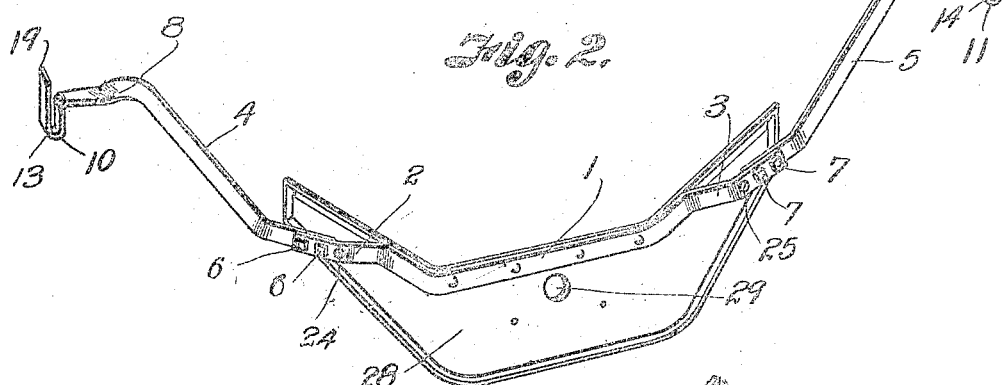
Fig. 2 is a rear perspective view of the front fender braces and splash guard ready to be applied.
Figure 3:
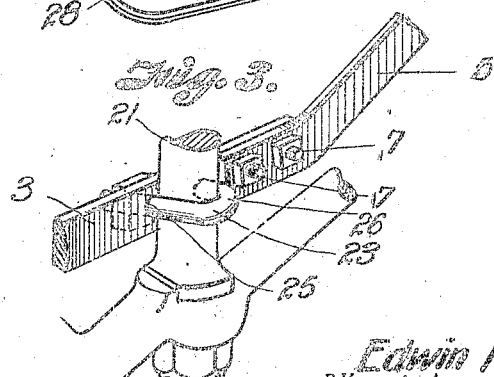
Fig. 3 is a fragmentary view of one of the lamp posts, showing the manner of attaching the fender brace thereto.

The bar 1 is fastened to the lamp posts 21 and 22 by J-bolts 23, which extend through the openings 24 and 25 and have their hook portions 26 extending around the lamp posts 21 and 22 so that the braces will be securely anchored to the motor vehicle. The intermediate portion of the bar 1 is slightly offset with respect to the arms 2 and 3 so as to conform to the bottom of the radiator 27, and secured to said bar is a vertical splash guard 28, clearly seen in Fig. 2. Where the splash guard is employed, it is provided with an opening 29 so that the crank 30 may be introduced to engage the engine crank to permit the engine to be started.

The upper edge of the splash guard, or if it is not employed, the upper edge of the bar 1, fits snugly against the underside of the radiator so that liability of rattling will be prevented. The arms 4 and 5 maintain the fenders rigid and support them against sagging so that the symmetrical appearance of the car will not be destroyed.

The rear fenders are supported by the bars 31 and 32 having openings 33 and 34 respectively, through which project bolts 34' and 35', receiving between them the longitudinal side members 35 of the chassis frame and the ends of the bars 31 and 32 are received in the ends of the channel 36 of the chassis frame, as clearly seen in Fig. 4. Each of the bars 31 and 32 has an upstanding, outwardly curved arm 37 provided with a twisted end 38 bent downwardly and upwardly at 39 to provide a notched or slotted portion to receive the flanges of the rear fenders 40 and 41, the ends 42 being bent over the edges of the rear fenders to hold them in fixed relation with respect to the rear braces, as shown in Fig. 6. The bolts 34' and 35' carry nuts 43 and 44 which draw the plate 45 toward the bars 31 and 32 to clamp the side members 35 between them.

What I claim and desire to secure by Letters-Patent is:

1. A fender brace comprising a sectional device consisting of an intermediate member and two upwardly inclined, outstanding arms, the arms having means for engaging the outer edges of the fenders, and J-bolts engaging the lamp posts on the motor vehicle and securing the intermediate member thereto.

2. A fender brace comprising a sectional device consisting of an intermediate member and two upwardly inclined, outstanding arms, the arms having means for engaging the outer edges of the fenders, J-bolts engaging the lamp posts on the motor vehicle and securing the intermediate member thereto, and a splash guard carried by the intermediate member.

3. A fender brace comprising an intermediate member, means for securing the intermediate member to conventional parts of the front of a motor vehicle, a splash guard carried by the intermediate member, and outstanding, upwardly inclined arms carried by the intermediate member, the outer terminals of which have fender-engaging portions.

4. A fender brace comprising an intermediate member, means for securing the intermediate member to conventional parts of the front of a motor vehicle, a splash guard carried by the intermediate member, and outstanding, upwardly inclined, removable arms carried by the intermediate member, the outer terminals of which have fender-engaging portions.

5. A fender brace for motor vehicles comprising an intermediate member and two removable, upwardly inclined, outstanding arms, means for removably securing the arms to the intermediate member, flexible fingers on the free ends of the arms bendable over the edges of the front fenders of the motor vehicle, and a splash guard carried by the intermediate member and depending therefrom.

6. In a device of the class described, an intermediate member, a splash guard carried by the intermediate member, and outstanding, upwardly inclined arms projecting from the ends of the intermediate member, the outer terminals of the arms having their ends bent back to engage the edges of a motor vehicle fender.

In testimony whereof I affix my signature.

EDWIN M. ARNOLD.